United States Patent Office 2,983,519
Patented May 9, 1961

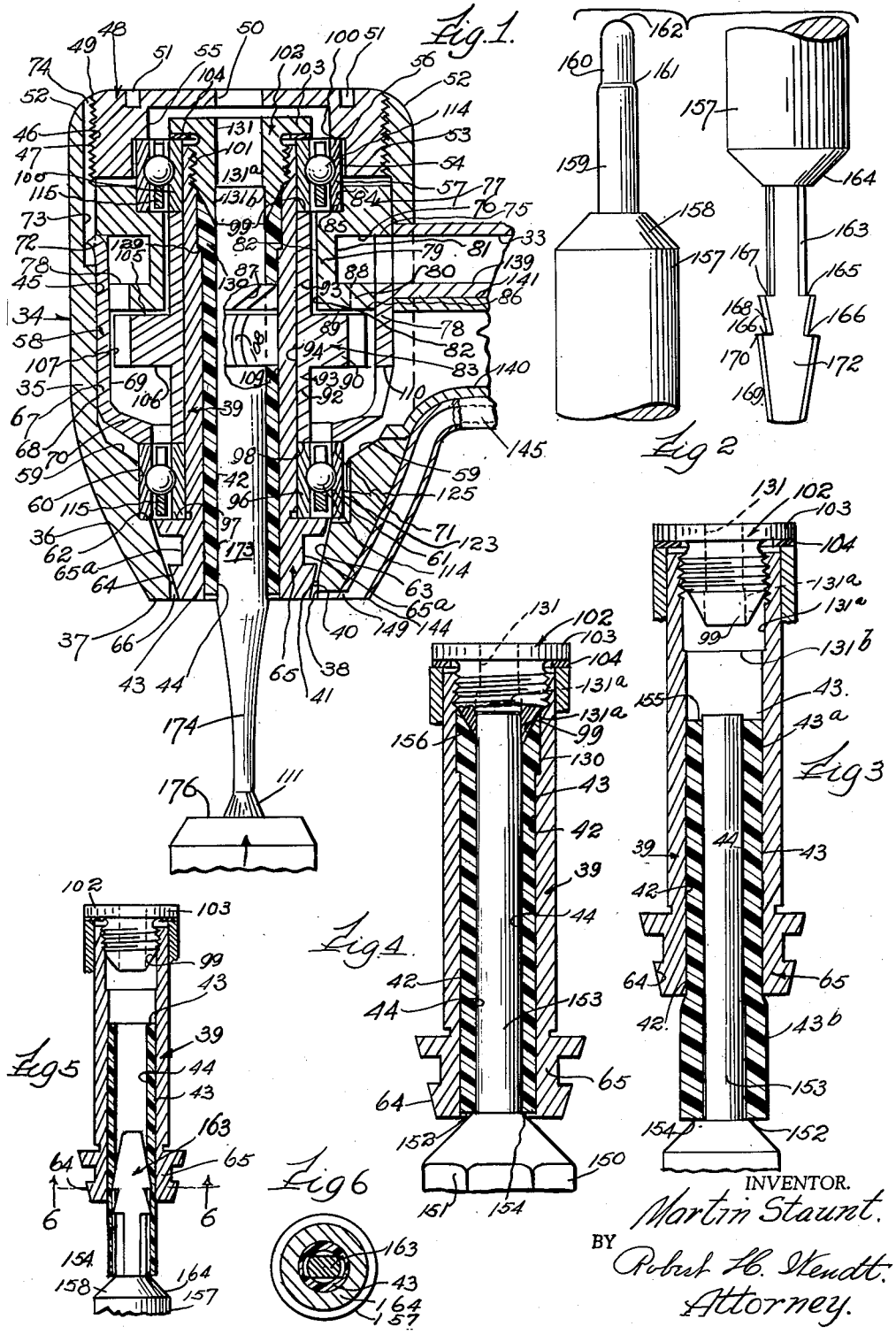

2,983,519
CHUCKS FOR DENTAL HANDPIECES
Martin Staunt, 4439 W. Rice St., Des Plaines, Ill.
Filed Nov. 24, 1958, Ser. No. 776,037
5 Claims. (Cl. 279—104)

The present invention relates to chucks for dental handpieces, and is particularly concerned with the provision of an improved mounting or chuck for the shank of a bur or other tool in the shaft of an air driven dental handpiece.

One of the objects of the invention is the provision of an improved means for receiving and gripping the shank of a bur or other tool which is simple in construction, which has a minimum number of parts, which may be manufactured economically, which has a prolonged life over the devices of the prior art, and which is readily replaceable by the dentist or other user.

Another object of the invention is the provision of an improved hollow shaft construction and chuck for the shank of a bur or other tool in which the shaft is provided with a plastic bur sleeve therein that is usable for a long period of time, but is replaceable by the user, in which the plastic bur sleeve is automatically anchored in the hollow shaft, so that bur shanks may be inserted by hand, and may be held therein, but may also be removed without pulling out the plastic bur sleeve.

Another object of the invention is the provision of an improved bur shaft for dental handpieces, having a bore into which the plastic bur sleeve may be pushed by hand two-thirds of the way, and thereafter pushed the rest of the way by a tool, the bur shaft having an inwardly beveled nut in its end, the bevel of which engages inside the end of the plastic bur sleeve, expanding the end portion of the plastic bur sleeve into a slightly larger bore in the upper end of the bur shaft, forming an annular shoulder on the upper end of the bur sleeve, which anchors the plastic sleeve in the shaft.

Another object of the invention is the provision of an improved hollow bur shaft and a plastic bur sleeve construction for supporting a bur shank, which permits the user to slide a new bur sleeve into the hollow shaft most of the way by hand, and thereafter a tool having a mandrel fitting in the bur sleeve may be used to push the plastic bur sleeve the rest of the way, anchoring the bur sleeve at its upper end in the hollow shaft, and compressing the lower end of the bur sleeve into the bore so that it will better resist the lateral thrust on the bur shank, which occurs at the lower end of the bur sleeve.

Another object of the invention is the provision of an improved chuck or mounting for a bur shank in the shaft of an air driven handpiece, which may be installed and maintained in accurately concentric and axial position to eliminate wobbling or eccentricity or vibration, which might result from a bur sleeve if it were not concentric and axial.

Another object of the invention is the provision of an improved tool for installing and anchoring plastic bur sleeves in the hollow shaft of a contra angle and for pushing a bur shaft out of the bur sleeve when the bur is to be removed, a tool for expanding a bur sleeve concentrically, and a tool for removing an anchored plastic sleeve from the hollow shaft.

The present application is a continuation-in-part of my prior application, Ser. No. 633,068, filed January 8, 1957, on Contra Angles for Dental Handpieces, U.S. Patent No. 2,911,721, issued November 10, 1959.

Other objects and advantages of the invention will be apparent from the following description and the accompanying drawings, in which similar characters of reference indicate similar parts throughout the several views.

Referring to the single sheet of drawings accompanying this specification,

Fig. 1 is a fragmentary vertical sectional view, taken through the head of an air driven dental handpiece on a plane passing through the axis of the bur shaft, embodying my invention;

Fig. 2 is a fragmentary side elevational view of a combined bur sleeve extractor and bur sleeve expander;

Fig. 3 is a fragmentary sectional view showing the method of inserting a new plastic bur sleeve, which is inserted two-thirds of the way by hand;

Fig. 4 is a similar fragmentary sectional view showing the bur sleeve when it has been fully inserted and expanded by means of the expander tool;

Fig. 5 is a similar fragmentary view showing the extraction of a worn plastic bur sleeve, using the extractor of Fig. 2;

Fig. 6 is a sectional view taken on the plane of the line 6—6 of Fig. 5, looking in the direction of the arrows.

Referring to Fig. 1, the present chuck is shown in connection with an air driven dental handpiece of the contra angle type having a contra angle head for supporting and driving a dental bur.

The contra angle head 34 comprises a substantially cylindrical housing wall 35, which is rounded and tapered at its lower portion 36 to remove as much as possible of the housing that might obscure the view of a dental bur carried by the head.

The lower end of the head 34 has a plane surface 37 provided with a central circular aperture 38 that is slightly spaced from the circular end of a rotating bur shaft 39, leaving an annular clearance 40, serving as an annular air escape passage and an air spray nozzle for directing air toward the grinding end of the bur.

The head is provided with a rotating bur shaft or spindle 39, which has a cylindrical bore 42 containing a plastic bur sleeve 43, which also has a cylindrical bore 44 for frictionally gripping the cylindrical portion of a shank of a bur or other tool.

The head 34 is open at its upper end, being provided with a cylindrical bore 45, having an internally threaded counterbore 46 at its upper end for receiving the externally threaded portion 47 of a top cap 48, which closes the upper end 49 of the housing, except for a central aperture 50 in the cap that is used for inserting a tool employed in pushing out the shank of a dental bur when it is to be removed.

The cap has a pair of diametrically opposite circular sockets 51 for receiving the lugs of a spanner wrench used in tightening the cap.

The cap is rounded at its upper outer edge portion 52 and may be threaded so far into the head 34 that it merges with the top of the head, forming a smoothly rounded upper corner without projections that might injure the mouth. At its lower side the cap 48 is provided with a plug formation 53 having a bore 54 large enough to receive the upper outer race of a ball bearing assembly; and the plug is formed with a smaller counterbore 55 for receiving the upper end of the spindle and its associated parts with a clearance so that the spindle may rotate without contacting the cover.

The plug formation 53 has an annular shoulder 56 for engaging the outer race of the upper ball bearing assembly 57 to secure the removable turbine unit 58 in the head 34. The head 34 has an inner frusto-conical surface 59 toward its lower end and a reduced counterbore 60 for receiving the outer race of a lower ball bearing assembly 61 against an annular shoulder 62.

From the annular shoulder 62 the interior of the head 34 has a frusto-conical inner surface 63, providing a clearance with respect to the external frusto-conical surface 64 on an enlargement 65 of the bur shaft 39, thereby forming the annular nozzle clearance 40, which is slightly enlarged at its lower end by forming a flaring crack of annular shape.

The air escaping from this crack provides an outward flow which excludes dirt and grindings from the housing, while still maintaining air pressure inside the housing.

The air turbine constitutes a removable unit because all of its parts are carried by a cylindrical stainless steel shell 67, having an outer cylindrical surface 68 and an inner cylindrical surface 69.

At its lower end the shell has an inwardly extending frusto-conical flange 70, terminating in an annular end surface 71 that engages the top of the outer race of the lower ball bearing assembly 61 to secure it in the head 34.

The shell 67 fits in the bore 45 of the head 34 and is secured against rotation therein by an outwardly turned tab or lug 72 pressed out of its upper edge to extend into a rectangular groove 73, which extends upwardly across the threads 46, and is open at its top end 74 so that the turbine unit may be slid downward into the bore 45 when the lug 72 registers with the groove 73; but thereafter the shell cannot rotate.

The upper end of the shell 67 is indicated at 75, presenting an annular surface which engages the lower surface 76 of an upper enlargement 77 of a stator 78. The stator 78 comprises a cylindrical body or enlargement 77 integrally joined to a central tubular portion 79 and a lower cylindrical body 80, which forms the floor or lower wall of an annular groove 81, forming a stator air manifold.

The tubular portion 79 of the stator has a through bore 82, clearing the parts of a rotor 83; and there is a cylindrical bore 84 in the top of the stator, terminating at an annular shoulder 85, engaging the lower edge of the outer race of the upper ball bearing assembly, which is located in the counterbore 84.

The stator enlargement 77 closes the upper end of the stator manifold 81 by engaging the shell 67; and the lower floor 80 of the stator engages in the shell bore with its outer cylindrical surface 86, and closes the lower side of the air manifold 81, except that the floor 80 of the stator has a multiplicity of nozzle slots 87, which form nozzle apertures in combination with the inner surface 69 of the shell 67.

The slots 87 in the stator floor are at an acute angle to the upper and lower stator surfaces 88, 89 so that the air issuing from the surface 89 of the stator has an axial component to move the air out of the stator and into the rotor; but the major component is in a peripheral direction and in the direction of rotation of the rotor.

For example, the slots 87 may extend at an angle of 65 degrees; and they may be ten thousandths of an inch in width and rectangular in shape. A multiplicity of slots is provided, such as 16 slots in the stator, with twice as many slots, or 32, in the rotor.

The rotor 83 comprises a substantially cylindrical metal body preferably made of stainless steel like the other parts of the handpiece; and its body 90 is integrally joined to a pair of tubular extensions 91, 92, having cylindrical outer surfaces 93 and a cylindrical bore 94.

The cylindrical bore 94 is adapted to receive the tubular body 95 of a bur shaft, which has a frusto-conical enlargement 65 at its lower end. The cylindrical part 95 of the bur shaft may support an inner race 96 of the ball bearing assembly 61 against the annular shoulder 97; and this race is in turn engaged by the end surface 98 of the tube 92.

The tube 92, rotor body 90, and upper tube 93 are mounted on the bur shaft; and the upper end 99 of the rotor tube 93 engages the bottom of the upper ball bearing race 100. The bur shaft has its bore 42 provided at its upper end with inner threads 101 and with a screw plug 102 threaded into the threaded bore.

Left hand threads are used on plug 102 and bore 101 so that the plug will not be loosened by rotation of the spindle.

The screw plug 102 has a radial flange 103 engaging a metal washer 104, which is spaced from the end of the bur shaft; but the washer engages the race 100, clamping the two races and the rotor on the bur shaft.

The rotor body 90 has an upper plane surface 105 and a lower plane surface 106, forming a cylindrical body with an outer cylindrical surface 107, having a close clearance with respect to the inner surface 69 of the shell, but permitting the rotor to rotate freely without contact.

The rotor preferably has curved slots 108, there being 32 such slots equally spaced from each other and symmetrically located. The air passes out of the stator slots 87 into the rotor slots 108, where the air is reversed in direction and discharged into a lower expansion chamber 109 and exhausted out of the turbine at a lateral exhaust port 110, driving the rotor at a very high speed, which may be 200,000 r.p.m. or more.

The ball bearings include only a limited number of balls 114 held in spaced relation by a nylon ball retainer 115, having circular sockets and smaller end grooves for holding the retainer on the balls.

The bur shaft 39 has an annular shoulder at 129 and a slightly larger counterbore 130, extending upward from said shoulder, where the counterbore is enlarged several thousandths to form an anchoring portion on the plastic sleeve 43. The bur shaft has a pair of parallel flats 65a at its lower end for grip by a wrench.

The hollow threaded plug 102 of stainless steel has a through aperture 131, which terminates in a counterbore 131a, forming an annular seat 131b for the upper end of the bur shank.

Referring to Fig. 3, this is a fragmentary sectional view, showing the insertion of a new plastic bur sleeve; and this shows the plastic bur sleeve 43 in its original condition, having upper and lower plane ends and a cylindrical bore 44.

The external cylindrical surface 43a of the plastic bur sleeve 43 extends over two-thirds of the length of the sleeve, and is a tight fit in the bore 42 of the bur shaft. The lower one-third of the plastic bur sleeve 43b is slightly enlarged, having an increased radius of approximately two thousandths of an inch; and after the plastic sleeve 43 has been inserted in the bore 42 two thirds of the way, as shown in Fig. 3, the inserting tool 150 must be employed, as shown in Fig. 4, to complete the insertion of a new plastic sleeve.

This tool comprises a plastic handle 151, which may be hexagonal in shape, and which tapers down to an annular shoulder 152 surrounding a stainless steel mandrel 153. The mandrel has its shank anchored in the plastic handle 151 and fits the inner bore 44 of the plastic bur sleeve 43 snugly.

Using the sleeve inserting tool 150, a push is exerted on the plane end 154 of the plastic sleeve of Teflon, causing the enlarged portion 43b to be compressed into the bore 42, while the mandrel is mounted in the bore 44, preventing expansion of the Teflon at the lower end of the plastic bur sleeve to be tightly compressed, and makes it able to resist the lateral pressure that is placed upon a bur shank in the grinding operation.

As the plastic bur sleeve 43 progresses upward in the bore 42, the upper plane end 155 strikes the lower beveled surface 156 on the screw plug 102; and the Teflon is cammed outward into the larger counterbore 130, completely filling the space around the beveled surface 156 and backing up against the annular shoulder 129, as shown in Figs. 1 and 4, and forming an enlargement which anchors the plastic bur sleeve in the tubular bur shaft.

The mandrel 153, which extends into the bore 44 of the plastic bur sleeve, preferably extends into the bore 131a of the screw plug 102 and fills the bore 44 of the plastic sleeve so that the bore is maintained intact and the plastic must expand outward into the counterbore 130.

When the inserting tool is removed, the plastic sleeve is ready to receive the shank of a bur and to grip it frictionally. The bur shank extends all the way up into the screw plug 102 in its counterbore 131a and seats against the annular shoulder 131b.

The combined expander and sleeve remover has both of its ends shown in Fig. 2; and it comprises a stainless steel body, having a cylindrical handle 157, having a tapered end 158 and an integral expander mandrel 159 projecting therefrom. This mandrel fits in the bore 44 of the plastic bur sleeve 43 and preferably has an end portion 160 which is a few thousandths smaller in diameter, merging into the main body 159 of the mandrel by a tapered portion 161.

The end of the expander is preferably rounded at 162. The expander is adapted to be inserted into the end of the plastic bur sleeve immediately after a new bur sleeve has been installed, without turning, for the purpose of assuring a true running bur. This expanding operation need not be repeated unless a bur is encountered that is over size.

The lower compressed portion 43b of the plastic bur sleeve 43 tends to expand into the bore 44 after installing a new plastic bur sleeve; and this is corrected by the use of the expander shown in Fig. 2. The other end of the expander supports a bur sleeve removing tool 163, which is integrally joined to the handle 157 at a tapered portion 164.

The removing tool 163 is formed by starting with a mandrel large enough to substantially fill the end of the plastic bur sleeve 43 and by grinding a pair of V shaped grooves 165, 166 near to its end. These V shaped grooves are formed with an abrupt shoulder 167 on one side and a tapered portion 168 on the other side of the groove; and thus a pair of prongs are provided which have tapered surfaces 169 and 168 leading to the sharp prongs 170, 171 and abrupt shoulders 167 on the rear side of the prongs.

The prongs are accentuated by grinding a flat surface 172 upon the opposite sides of the tool; and this causes the prongs to project still more so that they engage in the plastic of the sleeve 43.

Fig. 5 shows the insertion of the tool 163 in the plastic bur sleeve and the pulling of the plastic bur sleeve out of the hollow bur shaft 39. The tool is preferably inserted until the tapered shoulder 164 hits the end 154 of the plastic bur sleeve; and during this insertion the prongs make their own way, due to the taper at 168 and 169.

When the tool is withdrawn, the prongs 170, 171 engage in the plastic and exert sufficient force on the plastic tube to smooth out the enlargement which is formed at the shoulder 130 and to permit the tube 43 to be withdrawn from the hollow shaft.

A new plastic bur sleeve may then be inserted two thirds of the way by hand, as shown in Fig. 3, and then forced the rest of the way by using the inserting tool 150, which expands the upper end of the plastic sleeve and anchors it at the shoulder 130 and also compresses the lower end portion 43b into the bore 42.

The new plastic bur sleeve may then be expanded, using the mandrel 159 of the expander; and thereafter it is adapted to grip the shank 173 of a bur 174, having its grinding end at 175. The bur shank may be inserted by hand until sufficient resistance is encountered to require the tool 150; and the tool 150 may be reversed so that the flat end 176 of its handle may be pressed against the end of the bur 175 to force the shank into the counterbore 131a of the screw plug 142 against the annular shoulder 131b.

It is desirable that the end of the plastic sleeve 43 be inserted until its end surface 154 is approximately one sixty-fourth of an inch inside the outer end of the hollow bur tube shaft.

This improves the action of the water spray, which comes from the nozzle end of the water tube 144 that is brazed to the housing 34. It is, of course important that the plastic bur sleeve grip the shank 173 of the bur 174 so that the bur does not rotate in the plastic sleeve, as the frictional grip of the plastic bur sleeve on the bur shank is essential.

It will thus be observed that I have invented an improved contra angle structure having a chuck which comprises a plastic sleeve anchored in a hollow shaft concentrically in such manner that burs may be mounted therein by merely pushing the shank in the sleeve; and they may also be removed by inserting the tool 150 through the aperture 50 in the cap and pushing the shank out.

This action of installing and removing a bur is resisted by the ball bearings, the inner races of which are clamped on the bur shaft, and the outer races of which are clamped in the fixed parts of the housing.

The balls of the ball bearings are held spaced from each other in the ball grooves of the races, from which they cannot escape as long as they are spaced by the ball retainer; and there is no danger that the balls can get out of the ball grooves, since there are no filling openings in the ball bearing races and the grooves are continuous.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A tool holding assembly for dental tools having a cylindrical shank, comprising a supporting housing, with a pair of ball bearing assemblies, each having an outer race supported by the housing against axial movement, an inner race inside each outer race, said races having continuous opposite circular grooves without filling openings, said grooves containing a limited number of balls spaced from each other by a plastic ball retainer having a radial circular bore and a restricting entry slot for each ball, holding said retainer on the balls which are spaced thereby, a hollow cylindrical shaft having said inner races secured thereon against axial movement, said shaft having a smaller threaded bore in its upper end, a threaded metal plug in said threaded bore, and having a radial flange securing the upper inner race on the shaft, said metal plug having an axial bore concentrically located in the shaft and fitting the cylindrical end of a tool shank to be held therein to center the shank, and a cylindrical plastic sleeve having its outer surface in tight frictional engagement with the inner surface of a cylindrical bore in said shaft, said plastic sleeve having a cylindrical bore extending through the plastic sleeve and registering with the bore in said metal plug and accurately sized to grip frictionally the cylindrical shank of said tool, said plastic sleeve being insertable and removable by axial thrust on the sleeve, but being held against axial movement by said ball bearings, which are uniformly spaced in said races, and said sleeve being held against movement of the sleeve on the shaft when a tool shank is inserted or removed manually.

2. A tool holding assembly according to claim 1, in which the concentric axial bore in the threaded plug has a smaller counterbore forming an annular seat for engaging the upper end of the tool shank and limiting the extent of insertion of the tool shank.

3. A tool holding assembly according to claim 1, in which the cylindrical bore in the shaft has an annular sleeve retaining shoulder and a slightly larger counterbore at its upper end into which the plastic sleeve is expanded by pressure on the lower end of the plastic sleeve to anchor the plastic sleeve in the shaft bore.

4. A tool holding assembly according to claim 3, in which the threaded plug has a round tapered end surface extending from its threads to a sharp annular edge, said end surface camming the plastic sleeve end outward and shaping the plastic into anchoring engagement with the hollow shaft in said counterbore with said annular shoulder.

5. A tool holding assembly according to claim 4, in which the plastic sleeve is of "Teflon" of a consistency permitting the plastic sleeve to be shaped and anchored by end pressure with a mandrel.

References Cited in the file of this patent

UNITED STATES PATENTS

| | | |
|---|---|---|
| 2,801,614 | Dieterich | Aug. 6, 1957 |
| 2,844,125 | Wehn | July 22, 1958 |
| 2,847,225 | Kosinski | Aug. 12, 1958 |
| 2,869,237 | Berge | Jan. 20, 1959 |